May 2, 1939.   C. A. BOOKER ET AL   2,156,448
CROSS-ARM BRACE
Filed Dec. 9, 1937
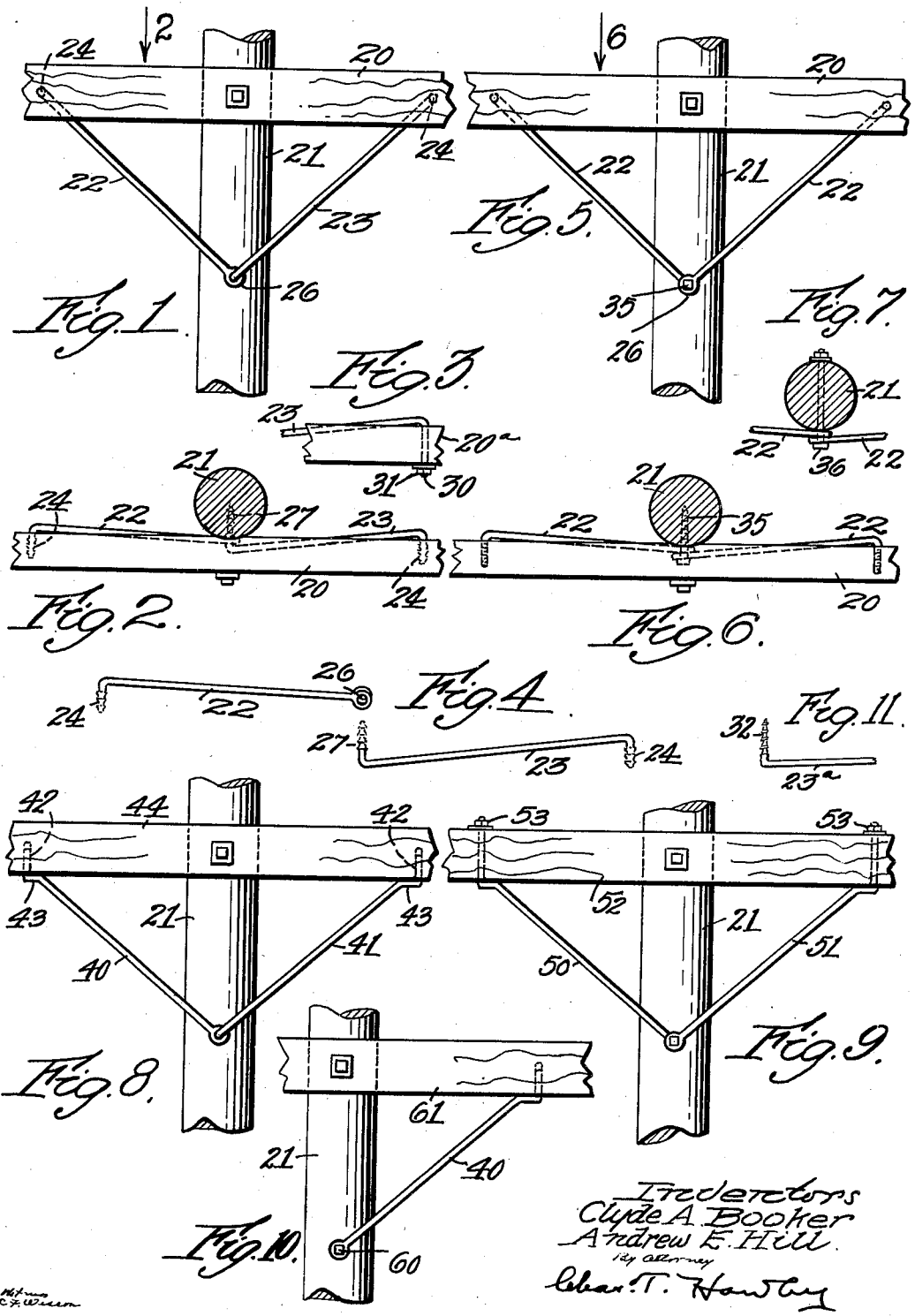

Patented May 2, 1939

2,156,448

UNITED STATES PATENT OFFICE 2,156,448

CROSS-ARM BRACE

Clyde A. Booker, Lexington, and Andrew E. Hill, Fitchburg, Mass.

Application December 9, 1937, Serial No. 178,982

2 Claims. (Cl. 189—33)

This invention relates to cross arm braces used in pole line constructions for power transmission and other similar purposes.

It is the general object of our invention to provide cross arm braces of improved and simplified construction, which may be economically manufactured and conveniently used either singly or in assembled pairs.

A further object of our invention is to provide both single and double cross arm braces which are complete in themselves and which require no additional fastening devices such as bolts or lag screws.

Our invention further relates to arrangements and combinations of parts which will be hereinafter described and more particularly pointed out in the appended claims.

Preferred forms of the invention are shown in the drawing, in which

Fig. 1 is a side elevation of portions of a pole and cross arm having our improved cross arm brace in double form applied thereto;

Fig. 2 is a plan view, looking in the direction of the arrow 2 in Fig. 1;

Fig. 3 is a partial plan view showing a modified construction;

Fig. 4 is a perspective view of the two members forming the double cross arm brace shown in Fig. 1;

Fig. 5 is a view similar to Fig. 1 but showing a different assembly;

Fig. 6 is a plan view, looking in the direction of the arrow 6 in Fig. 5;

Fig. 7 is a detail sectional view showing a modified construction;

Figs. 8 and 9 are views similar to Fig. 1 but showing additional modifications;

Fig. 10 illustrates our invention as embodied in a single cross arm brace; and

Fig. 11 is a detail view of an additional modification.

Referring to Figs. 1, 2 and 4, we have shown our invention applied to a cross arm 20 bolted to a pole 21. The double cross arm brace shown in said figures comprises two brace members 22 and 23. Each brace member is preferably formed from rolled steel rod and each has one end bent or laterally offset as indicated at 24.

The second end of the member 22 is enlarged and perforated to provide an eye 26, through which the second bent or offset end 27 of the member 23 may be inserted. The offset ends 24 and 27 are preferably barbed, ridged or corrugated to prevent easy withdrawal from the holes in the pole or cross arm in which they are inserted.

The members 22 and 23 are assembled by driving the offset portions 24 into suitable holes in the cross arm 20 and by inserting the offset portion 27 of the member 23 in the eye 26 of the member 22 and then driving said portion 27 into a prepared hole in the pole 21.

It will be noted that the double cross arm shown in Figs. 1, 2 and 4 may be assembled and secured by use of a hammer only, and that no additional fastening elements such as bolts or lag screws are necessary.

If desired, however, the upper ends of the members 22 and 23 which engage the cross arm as 20ª may be extended through the cross arm as indicated at 30 (Fig. 3) and may be threaded to receive a nut 31.

Instead of forming the offset portion 27 of the member 23 with barbs or corrugations, we may provide the same with a coarse screw thread, like a lag screw, as indicated at 32 on the brace member 23ª in Fig. 11. In assembling this brace member 23ª, the threaded part 32 will be screwed into a hole in the pole 21 before the cross arm 20 is placed in position, and the end 24 may then be inserted in the cross arm 20, before or after the cross arm is in place.

In the construction shown in Figs. 5 and 6, two of the brace members 22 which are provided with eyes 26 are assembled by inserting a lag screw 35 through the eyes 26 and into the pole 21. In the modified construction shown in Fig. 7, a bolt 36 is substituted for the lag screw 35 and extends entirely through the pole 21.

In Fig. 8, we have shown a modified construction in which brace members 40 and 41 are provided with offset ends 42 and shoulders 43. The ends 42 are inserted in holes in the under side of the cross arm 44. Each brace member is thus adapted to resist downward pressure on the portion of the cross arm 44 supported thereby.

The construction shown in Fig. 9 is similar to that shown in Fig. 8 except that the outer ends of the brace members 50 and 51 are extended upward through the cross arm 52 and are provided with nuts 53 on their upper ends. As thus constructed, each brace member 50 or 51 is adapted to resist tension as well as compression.

The manner of attachment of the members 50 and 51 to the pole is also shown as being similar to the attachment in Fig. 6 or Fig. 7.

In Fig. 10 we have shown a brace member 40 secured in position by a bolt or lag screw 60 and adapted to serve as a single brace for a cross arm 61, it being assumed that no brace is required to resist downward pressure on the left-hand portion of the arm 61. It will be understood that the braces 22, 23, 41 and 50 may be similarly used single if and when desired.

Having thus described several forms of our invention, it will appear that we have provided single cross arm braces in alternate forms which may be used either single or in pairs and which are particularly well adapted for the purposes for which they are designed. Attention is particularly called to the omission of separate fastening devices such as bolts or screws with the double constructions shown in Figs. 1, 2 and 8, and with single braces like 23, 23ª and 41.

Having thus described our invention and the advantages thereof, we do not wish to be limited to the details herein disclosed, otherwise than as set forth in the claims, but what we claim is:

1. A double cross arm brace comprising one brace member having a laterally offset securing portion at each end, and a second brace member having a laterally offset securing portion at one end and having an eye at the other end through which one offset portion of said first member may be inserted and thereafter secured in a supporting structure.

2. A double brace for attachment to a cross arm and pole comprising one brace member having a portion adapted to be inserted in an opening in said cross arm, and a second brace member having a portion adapted to be inserted in a second opening in said cross arm, said second member being also integrally adapted to secure both itself and said first brace member to said pole.

CLYDE A. BOOKER.
ANDREW E. HILL.